United States Patent
Dumse

(10) Patent No.: US 6,170,969 B1
(45) Date of Patent: Jan. 9, 2001

(54) BOAT LIGHT

(76) Inventor: James F. Dumse, 307 S. 2nd Ave., Danville, IA (US) 52623

(\*) Notice: Under 35 U.S.C. 154(b), the term of this patent shall be extended for 0 days.

(21) Appl. No.: 09/441,029

(22) Filed: Nov. 16, 1999

(51) Int. Cl.$^7$ .................................................. B60Q 1/26
(52) U.S. Cl. ........................................... 362/477; 362/540
(58) Field of Search ..................................... 362/477, 511, 362/540, 551, 558, 577, 581, 582; 340/984; 114/66, 343

(56) References Cited

U.S. PATENT DOCUMENTS

| | | | |
|---|---|---|---|
| 2,207,117 | 7/1940 | Collins | 40/130 |
| 3,497,981 | 3/1970 | Tyne | 40/130 |
| 3,641,332 | 2/1972 | Reick et al. | |
| 4,274,127 | * 6/1981 | Beck et al. | 362/511 |
| 4,422,719 | 12/1983 | Orcutt | 350/96.3 |
| 4,733,332 | 3/1988 | Yamashita et al. | 362/32 |
| 5,339,225 | * 8/1994 | Wiggerman | 362/477 |
| 5,383,103 | 1/1995 | Pasch et al. | 362/102 |

FOREIGN PATENT DOCUMENTS

1390255 * 4/1975 (GB) ................................. 362/477

\* cited by examiner

*Primary Examiner*—Y. Quach
(74) *Attorney, Agent, or Firm*—Zarley, McKee, Thomte, Voorhees & Sease

(57) ABSTRACT

A boat light assembly for a boat having a hull with forward and rearward end, and a motor for propelling the boat on the rearward end, and a boat operator stationed adjacent the rearward end, has an assembly mounted on the rearward end of the hull and comprises an upstanding rod comprised only of an acrylic material. At least a portion of the outer surface of the rod is textured or diffused. A shrouded light source is mounted adjacent the lower end of the rod to permit a diffused light to extend longitudinally through the rod for peripheral visibly through the textured outer surface of the rod, and to provide peripheral subdued lighting for the area of the boat without retarding the night vision of a boat operator positioned in the operator's station. The rod is completing uncovered by any shielding material to provide exterior visibility from any direction or vantage portion surrounding the rod.

3 Claims, 1 Drawing Sheet

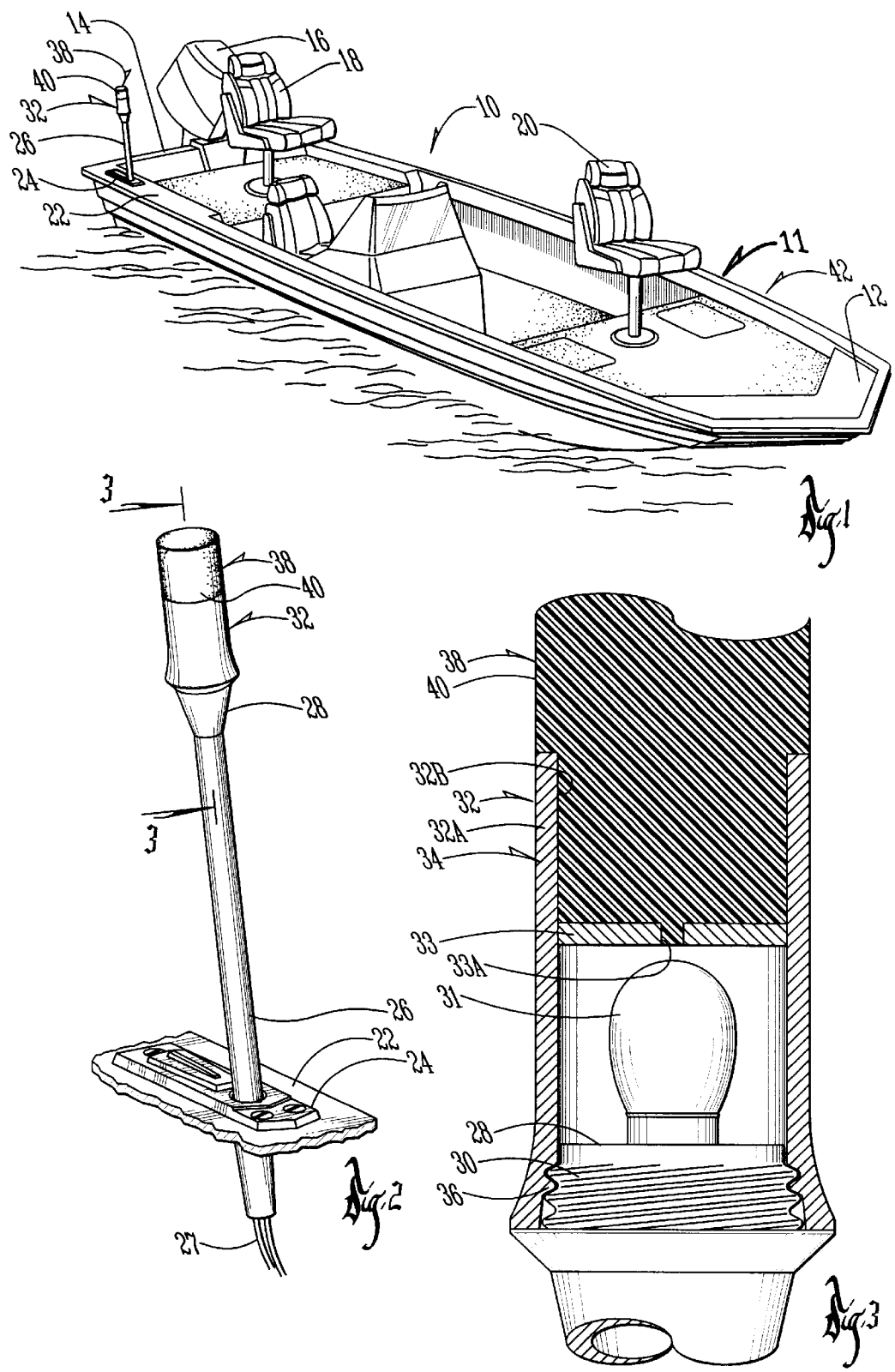

BOAT LIGHT

BACKGROUND OF THE INVENTION

Boating regulations in many states have certain minimal requirements that fishing boats and the like have running lights that can be seen for up to a distance of a mile or more. In a conventional open fishing boat, where the operator sits in the rearward portion of the boat to attend an outboard motor or the like, the running light for such a boat is typically mounted in the immediate area where the operator is sitting.

One of the great shortcomings of existing boat running lights is that in order for them to be bright enough to be seen at long distances, the brightness of the lights substantially diminishes the night sight of the operator. This means that the operator cannot easily see the bow of the boat and the area of the forward portion of the boat immediately surrounding the bow. This creates a dangerous situation and invites accidents such as when the operator would drive the boat into an obstacle in the water simply because the vision of the obstacle immediately in front of the boat could not be seen because of the glare of the running lights.

It is therefore a principal object of this invention to provide a running light of an open boat which can be easily seen at a long distance, but which will not diminish the night sight of the boat's operator.

A further object of this invention is to provide a boat light which is inexpensive in manufacture and operation, and which can be easily replaced as required.

These and other objects will be apparent to those skilled in the art.

SUMMARY OF THE INVENTION

A boat light assembly for a boat having a hull with forward and rearward end, and a power means for propelling the boat on the rearward end, and a boat operator stationed adjacent the rearward end, has an assembly mounted on the rearward end of the hull and comprises an upstanding rod comprised only of an acrylic material. At least a portion of the outer surface of the rod is textured or diffused. A shrouded light source is mounted adjacent the lower end of the rod to permit a diffused light to extend longitudinally through the rod for peripheral visibly through the textured outer surface of the rod, and to provide peripheral subdued lighting for the area of the boat without retarding the night vision of a boat operator positioned in the operator's station. The rod is completing uncovered by any shielding material to provide exterior visibility from any direction or vantage portion surrounding the rod.

BRIEF DESCRIPTION OF THE DRAWINGS

FIG. 1 is a perspective view of a boat having the boat light of this invention mounted thereon;

FIG. 2 is an enlarged scale partial perspective view of the boat light of this invention; and FIG. 3 is an enlarged scale sectional view taken on line 3—3 of FIG. 2.

DESCRIPTION OF THE PREFERRED EMBODIMENT

A fishing boat 10 with a hull 11 has a forward bow 12 and a rearward stern 14. A conventional outboard motor 16 is shown mounted on the stern in any conventional manner. A conventional rear seat 18 is located in the rearward portion of the boat 10, and a typical front seat 20 is mounted in the forward portion of the boat.

A conventional gunnel 22 extends around the upper periphery of the boat. A bracket 24 (FIG. 2) is mounted on the gunnel adjacent the rearward end of the boat. An elongated tube 26 extends upwardly through and is secured to the bracket 24 and houses electrical leads 27 which extend through the tube 26 and which extend downwardly for connection to a source of electrical energy such as a battery or the like (not shown).

A socket fitting 28 is mounted on the upper end of tube 26 and terminates in bulb threads 30. An electrical bulb 31 is mounted in socket fitting 28 in any conventional manner and is operatively connected to a source of electrical energy through leads 27.

A light display assembly 32 includes fitting 34 which has internal bulb threads 36 which are adapted to be received by the bulb threads 30 in fitting 28. The display assembly 32 includes upstanding cylindrical sidewall 32A. A socket 32B appears in the upper end thereof and is created by a cap member 33 which has an aperture 33A in the center thereof. The assembly 32 is comprised of an opaque material which preferably does not permit light to pass therethrough. The assembly 32 has a fitting 34 with threads 36 that received threads 30.

An elongated acrylic rod 38 is mounted in the upper end of light display assembly 32 directly above bulb 31. The assembly 32 has a side wall 32A and a socket 32B. The acrylic rod 38 has a textured surface 40 which can be created, for example, by using a light sandpaper to roughen or texture the surface 40.

The numeral 42 generally designates the area surrounding the forward end of the boat 10 and the water adjacent thereto.

In operation, when the boat 10 is being operated in the darkness, the operator can actuate a convenient switch (not shown) to permit electrical energy to pass through leads 27 to the socket fitting 28 and the bulb 31. When the bulb 31 thereupon becomes illuminated, the light therefrom extends upwardly through the aperture 33A in cap member 33. This arrangement permits light rays from bulb 31 to move upwardly along the center axis of the acrylic rod 38. Because of the nature of the composition of the acrylic rod 33, the light rays move generally longitudinally upwardly through the rod 38 rather than radially from the rod. While light is emitted in a radial direction, there is no glare from the light because of the textured surface 40 that appears on the outer surface thereof. It has been determined that light emitted radially from the rod 38 can be seen for substantial distances up to two miles. Nevertheless, the soft light that is emitted radially from the rod does not create a glare so as to impede the night sight of the operator. Further, the light is sufficient to provide good vision to the operator sitting in seat 18 to see the area 42 around the front of the boat and in the water forwardly of the boat.

It is therefore seen that this invention will achieve at least all of its stated objectives.

What is claimed is:

1. A boat having a hull with forward and rearward ends, power means for propelling the boat on the rearward end thereof, and a boat operator's station adjacent the power means, comprising, a boat light assembly mounted on the rearward end of the hull and comprising an upstanding solid rod comprised only of acrylic material and having an outer surface which is completely textured, and a light source which is shrouded and mounted adjacent a lower end of the rod and diffused light extending longitudinally through the rod for peripheral radial visibility through the textured outer surface of the rod, said rod providing peripheral subdued lighting for the area of the boat without retarding the night vision of a boat operator positioned in the operator's station, the rod being completely uncovered by any shielding material to provide exterior visibility from any direction surrounding the rod.

2. A boat light assembly for mounting on a rearward end of the hull of a boat adjacent a boat operators station, comprising, a boat light assembly including a light socket and bulb attachable to a source of electrical power, a shrouded fitting around the bulb, a socket in the fitting adjacent the bulb to receive a lower end of an acrylic rod, the rod having a completely textured outer surface from the socket to an upper end of the rod and providing peripheral subdued lighting for the area of the boat without retarding the night vision of a boat operator positioned in the operator's station, the rod being completely uncovered by any shielding material to provide exterior visibility from any direction surrounding the rod.

3. The boat light assembly of claim 2 wherein an opening is located in the socket through which the lower end of the rod extends into the socket, the opening being circular and having a diameter smaller than a diameter of the socket, the opening having a center axis in alignment with a center axis of the rod to facilitate the movement of light from the bulb longitudinally upwardly from the bulb.

* * * * *